United States Patent

[11] 3,608,753

[72] Inventor Ronald J. Scott
 211 West Cherry, Amarillo, Tex. 79108
[21] Appl. No. 827,366
[22] Filed May 23, 1969
[45] Patented Sept. 28, 1971

[54] COMBINE HEADER AND TRANSPORT APPARATUS
 1 Claim, 21 Drawing Figs.
[52] U.S. Cl. .................................................... 214/38 R,
 56/228, 296/3, 214/145
[51] Int. Cl. ...................................................... B65g 67/04
[50] Field of Search .......................................... 214/38 R;
 296/3; 56/228

[56] References Cited
 UNITED STATES PATENTS
2,599,366 6/1952 Bohnenblust.................. 56/228 X
3,245,695 4/1966 Bernard......................... 56/228 X Primary Examiner—Gerald M. Forlenza
Attorney—Ely Silverman ABSTRACT: A cooperatively related transport apparatus and loading apparatus organized for rapid and reliable use of the power of a combine machine to load a plurality of headers for transport by the steps of connecting the power of a combine to a header loading means; releasably supporting the bottom wall of said header at its rear while holding to an upper portion of said header by said loading means; transmitting power from said combine to said loading means and thereby raising the thus-held header upwards, and then moving said header transversely to the length thereof and towards and over a transport apparatus therefor and centrally of means thereon for attaching said header to said transport apparatus; then moving said header downwardly and laterally and thereby engaging said transport apparatus and said header-holding means spaced apart along length of the transport apparatus whereby limited longitudinal motion of said header relative to said transport apparatus is permitted, and at two other holding means spaced apart along length of said transport apparatus and transversely spaced away from said first holding means, said other holding means permitting limited transverse motion of said header relative to said transport apparatus; and removing said loading means from the header and locking said header to said transport apparatus at a point between said two other holding means.

RONALD SCOTT
INVENTOR.

BY Ely Silverman
ATTORNEY

INVENTOR.
RONALD SCOTT
BY Ely Silverman
ATTORNEY

RONALD SCOTT
INVENTOR.

BY

ATTORNEY

INVENTOR.
RONALD SCOTT
BY
Ely Silverman
ATTORNEY

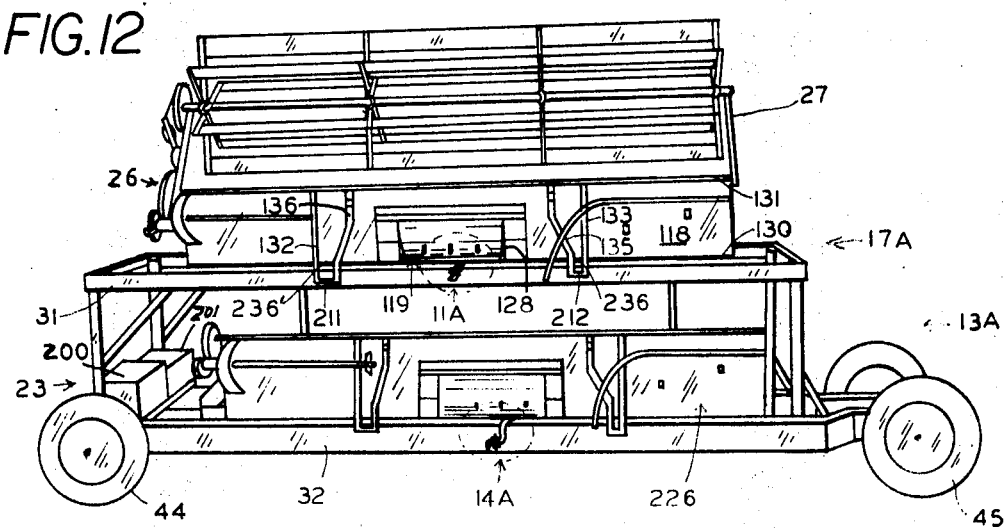
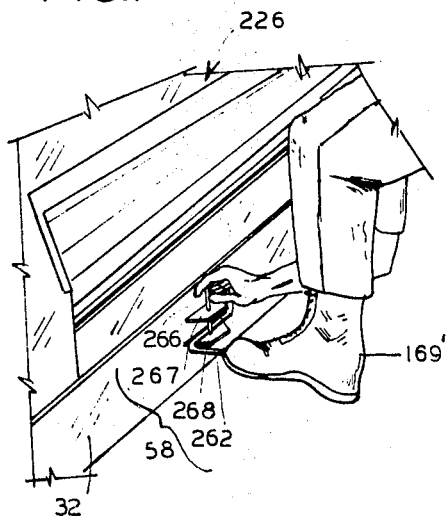
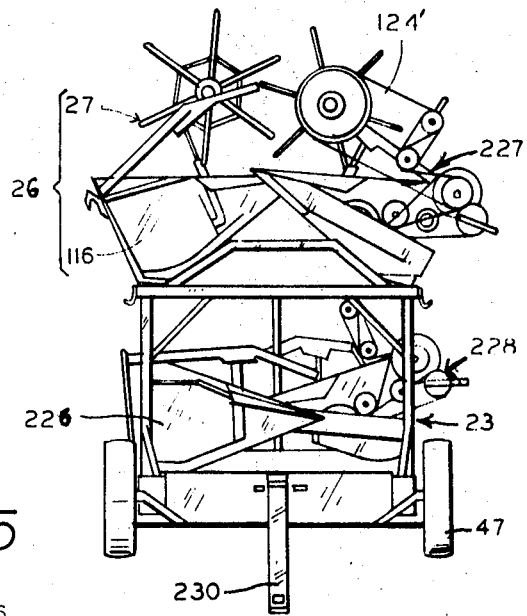
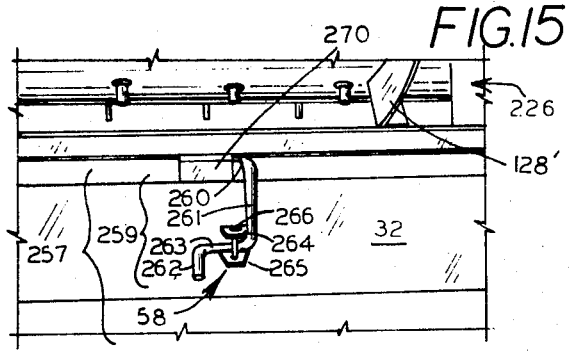
RONALD SCOTT
INVENTOR.
BY
*Ely Silverman*
ATTORNEY

RONALD SCOTT
INVENTOR.

BY
Ely Silverman
ATTORNEY 3,608,753

COMBINE HEADER AND TRANSPORT APPARATUS

BACKGROUND OF THE INVENTION

1. Field of the Invention

This invention relates to land vehicles and more particularly to devices for securing the load to the vehicle and for loading such vehicle.

2. Description of the Prior Art

Prior means for manipulating and loading headers of combines have required much and hazardous manual labor, transport of such headers have been damaging to the combine.

Appreciation of the sensitivity of these heavy, high-speed, closely dimensioned and apparently sturdy machines to repeated twist and vibration and design of a device to mount and disengage such apparatus on a transport therefor in a manner that was safe to personnel involved and appropriately carefully secured to the transport has been a longstanding problem prior to the process and apparatuses and their combination provided herewith.

SUMMARY

The transport apparatus 23 and loading assembly 24 are arranged to cooperate with each other in the process of this invention. A transport apparatus provides for transport of a plurality of headers without strain on each said header due to twist during travel of the transport apparatus over the unpaved roads and fields by supporting each of the headers on a wheeled open frame comprising a plurality of longitudinal beams each rigid in the vertical plane, first holding means firmly attached to one point on each said beam and holding said header laterally and downward to said one point on said beam, a second holding means on each beam holding said header to said traveling frame while permitting movement of said header transverse to the length of said traveling frame, and a third holding means holding each said header to said frame and permitting movement parallel to the length of said traveling frame, said holding means being spaced away from each other on said frame.

An adjustable and foldable loading frame assembly provides for loading a header for transport by using the power of a conventional combine to raise and manipulate the header to a proper position over the transport apparatus at which position the header may readily engage with the transport apparatus and following which an operator safely standing exterior to the apparatus may again quickly rearrange the components of the loading assembly while using the power of the combine engine again to effect its disengagement from the header and rapidly yet reliably and safely effect a strong resilient locking of each header apparatus to one point on the transport apparatus, holding at this one point in combination with providing other points of support allowing motion of the apparatus provides that the header may be transported without being subject to any undue twisting stress.

BRIEF DESCRIPTION OF THE DRAWINGS

FIG. 6 is an oblique front and side view in direction of arrow 6A of FIG. 4; FIG. 7 is a front and side perspective view along direction of arrow 7A of FIG. 4.

FIG. 8 is viewed as in FIG. 6 and shows the position of elevator assembly 28, loading frame assembly 24, header 26 and traveling frame 23 after the position shown in FIG. 6 and at time of initial location of the thus loaded header on the frame assembly, during the operation begun as shown in FIG. 6.

FIG. 9, shows in same direction of view as in FIG. 8, the initial stage in manipulation of the loading frame 23, and release of a latch assembly thereof to permit change of the shape of the loading assembly for its separation from the header 26.

FIG. 10 shows, in perspective the loading assembly after the stage shown in FIG. 9 and after its separation from the header and movement to a lowered position.

FIG. 11 shows a rear and side oblique view of zone 11A in FIG. 12 showing details of the relation of components of the top lock and release assembly during attachment of header 26 to frame 23.

FIG. 12 is a side view of the frame 23 carrying a load of four headers thereon, and FIG. 13 is a front end view thereof partly broken away, as seen along arrow 13A of FIG. 12.

FIG. 14 is a rear and side oblique view of zone 14A of FIG. 12 showing details of relations of the components of the bottom lock and release assembly 58 during attachment of a header 226 thereby to the frame 23.

FIG. 15 is an enlarged side view of zone 14A of FIG. 12.

Figure 1:
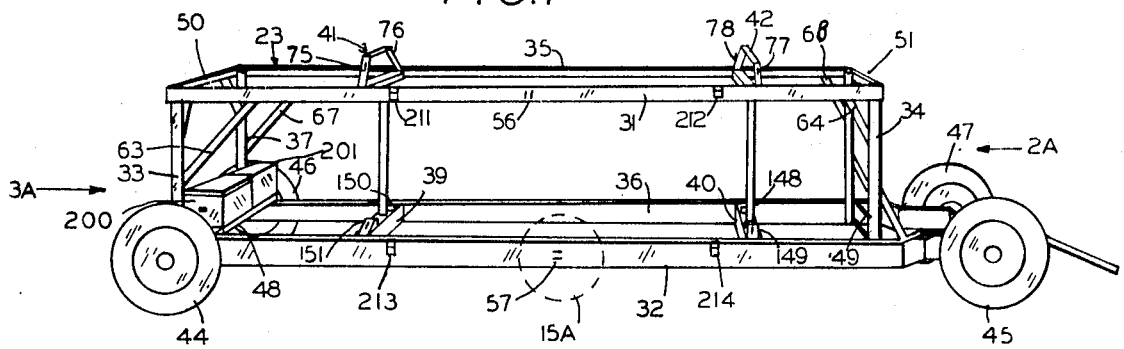
FIG. 1 is a side view of the traveling frame when empty, the view being taken along the direction of the arrow 1A of FIG. 2.

To better illustrate quantitative relations of structures there shown, FIGS. 1, 2, 3, 4, 12, 13, 15 and 18 (and units 25 and 24 in FIG. 10) are to scale, being views as seen by photographs of structures located in one plane and FIGS. 5, 6, 7, 8, 9, 10 (in part), 11, 14, 16, 17 and 19 are shown in perspective as seen by photograph.

Dimensions of the embodiment shown in FIGS. 1–19 are given in table I. Other dimensions of structures may be approximated by reference to the figures drawn to scale.

DESCRIPTION OF THE PREFERRED EMBODIMENT

The apparatus 21 according to this invention comprises an open traveling frame assembly 23 used in cooperative combination with a loading frame assembly 24. The loading frame assembly 24 is constructed and adjusted to be mounted on a conventional harvester 25; such harvester operates with and while supporting a header (table) 26 with a reel 27 and a pivotally mounted elevator 28 thereon. The reel, header and elevator are manipulated by the controls 29 on the harvester 25. Such a harvester is shown in U.S. Pat. No. 2,656,668 and Massey Ferguson 92 combine brochure 218/561-50-1, Copyright 1961.

Figure 4:
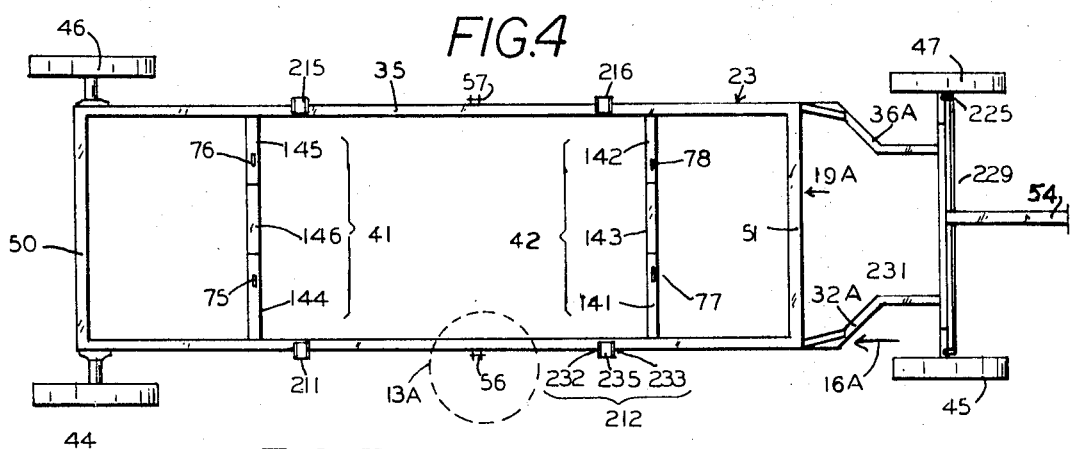
FIG. 4 is a top view of the empty frame assembly shown in FIG. 1.
Figure 5:
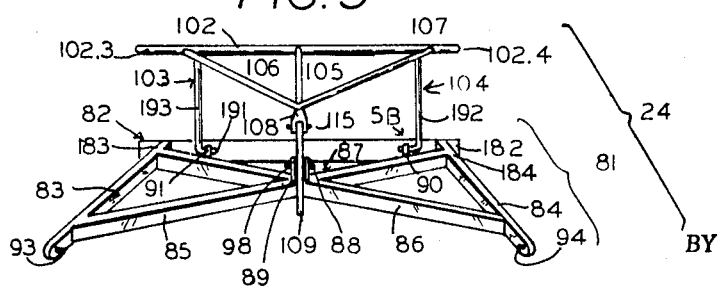
FIG. 5 is a rear view of the loading frame assembly 24 as seen along arrow 5C of FIG. 10.

The right and left sides of frame assembly 23 as herein referred to are viewed in the usual forward direction of lineal movement of the apparatus 23, that is, the movement of the apparatus 23 from its rear (left as shown in FIGS. 1 and 4) to its front (right as shown in FIGS. 1 and 4).

The traveling frame 23 comprises, on the right side, a top sturdy horizontal longitudinal right steel beam member 31, a like bottom horizontal steel beam member 32, a rear vertical steel rigid leg member 33, and a rigid front vertical steel leg member 34. Member 31 is an ell with a long thin vertical plate and a shorter horizontal upper rib or shoulder whereby that element is rigid against flexure in the vertical plane of that vertical plate. These members are firmly joined together at their corners, as shown in FIG. 1, to form the vertically extending right side of an open box frame. A corresponding top horizontal member 35, bottom horizontal member 36, a left rear vertical member 37, and right rear vertical member 38 are similarly joined to form a vertically extending open frame side on the left side of the apparatus 23.

The members 31 and 35 are joined by a pair of top transverse rigid crossmembers 41 and 42 rigidly supported thereon and the bottom members 32 and 36 are joined by the lower transverse bottom crossmembers 39 and 40 firmly and rigidly affixed thereto. The bottom members 32 and 36 are also joined at their rear by rear bottom member 48, members 33 and 32 are joined at their top by top rear member 50. At the intersection of member 32 with the member 34 and at the intersection of member 36 with 38 a front bottom transverse member 49 is located and there firmly joined respectively to members 32 and 36. A front top transverse member 51 joins the members 34 and 38 at their front ends.

The top front crossmember 42 has a laterally and downwardly sloped right portion 141 and upwardly and centrally directed top portion 142 and a horizontal center top front brace portion 143. These components 141, 142 and 143 are rigid and firmly joined together seriatum as shown in FIG. 4 and comprise the top front cross element 42. The rear top transverse cross member 41 comprises a rigid right side laterally and downwardly tilted bracket portion 144, a left side upward and centrally sloped portion 145 and a center horizontal top rear bracket portion 146 firmly joined together and connected the members 31 and 35 generally as shown in FIGS. 1, 2 and 4.

Figure 2:
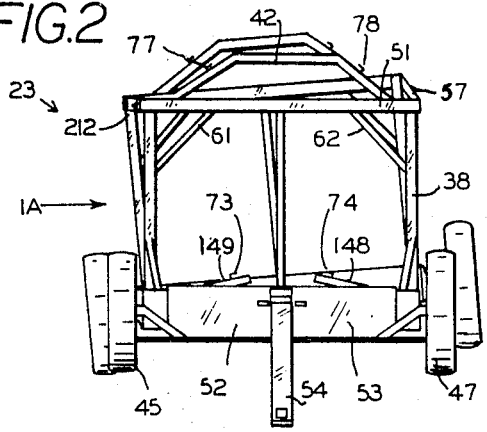
FIG. 2 is a front view taken along the direction of the arrow 2A of FIG. 1, with the front wheels of the frame on horizontal ground and rear wheels on ground that is not level.
Figure 3:
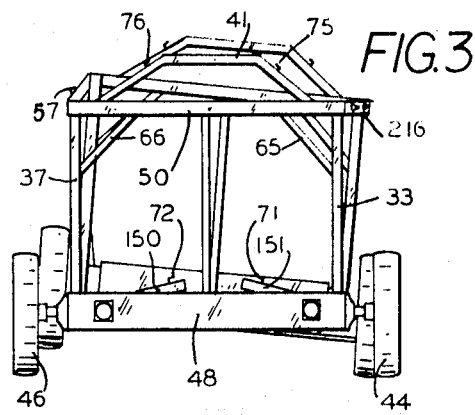
FIG. 3 is a rear view of the frame shown in FIG. 1 taken along the arrow 3A of FIG. 1 with the rear wheels of the frame on horizontal ground and front wheels on ground that is not level.

The bottom members 32 and 36 are joined by rigid front and intermediate rear and front transverse crossmembers 39 and 40 and the front member 40 has on its left side a left front foot 148 and on its right side a right front foot 149 as in FIG. 2. The rear member 48 has a left rear foot 150 and a right rear foot 151 generally as shown in FIG. 3. These foot members serve to engage portions of the headers which they are intended to transport. These feet each support hooklike members as 71 through 74. These members as 71 through 78 engage the longitudinal member as 129 of each header as 26.

The bottom rear crossmember 39 is provided at its top surface with lower rear right locking hook 71 and lower rear left locking hook 72 72; the bottom front crossmember 40 is provided at its top surface with bottom front right and left locking hooks 73 and 74; the top rear crossmember 41 is provided at its top surface with top rear right and left hooks 75 and 76 and the top front crossmember is provided with top front left and right locking hooks 77 and 78.

Each of the hooks 71, 72, 73 and 74 is firmly located, respectively on the footings therefor, i.e. hook feet 151, 150, 149 and 148 respectively.

Each of the feet 148-151 is sloped upwardly and centrally and in substantially the same amount as portions 141 and 143, as shown in FIGS. 1, 2, 3 and 7. Each of the hooks as 71-78 is composed, as shown for 77 in FIG. 7, of a footing element as 177 firmly attached to the upwardly and centrally sloped support element therefor as 141, a spacer arm as 178 and a locking arm as 179, parallel to and spaced away from 141 all firmly connected together in series, the footing element firmly connected to the support therefor, as 141, with the locking arm spaced away substantially parallel to and so substantially an equal distance along its entire length from the support 141 by a space 180 therebetween.

The hook members 71-78 serve to hold portions of the headers as 26 which are intended to be transported by the frame 23 by engagement with the longitudinal members as 129 of each header as 26 in the space 180 other hooks hold to member 131 thereof.

Wheels 44-48 are located on the bottom of frame 23 as shown in FIGS. 1-4 and are rotatably attached thereto. The rear wheels 44 and 46 are located with their axes of rotation through the center of member 48 (as in FIG. 3). The front wheels 45 and 47 are located on rigid extensions 32A and 36A of members 32 and 36 respectively forward of the frame members 34 and 38. Each of the front wheels as 47 is rotatably supported on a standard steering knuckle as 225 with a tie nose 229 connected therefrom to a drawbar 230, the drawbar 230 is pivotally attached to the axle 231; the steering knuckle rotatably supports the wheels 47 and 48 on the axle 231. Wheels 46 and 47 are in line with each other and wheels 44 and 45 are in line with each other.

Each of the side members 31, 32, 35 and 36, is, as 31, provided with outboardly located inwardly and upwardly projecting front and rear hook units as 212 and 211 and a central latch assembly bracket as 56, these units each being fixedly attached to and located on the outer surface of such side member and projecting outboard thereof; units 215, 216 and 57 are units like 211, 212 and 56 respectively and are similarly located on element 32; like hook units 213, 214 (like units 211 and 212 respectively) are similarly located on element 32 and like hook units not shown are similarly located on unit 36.

Figure 6:
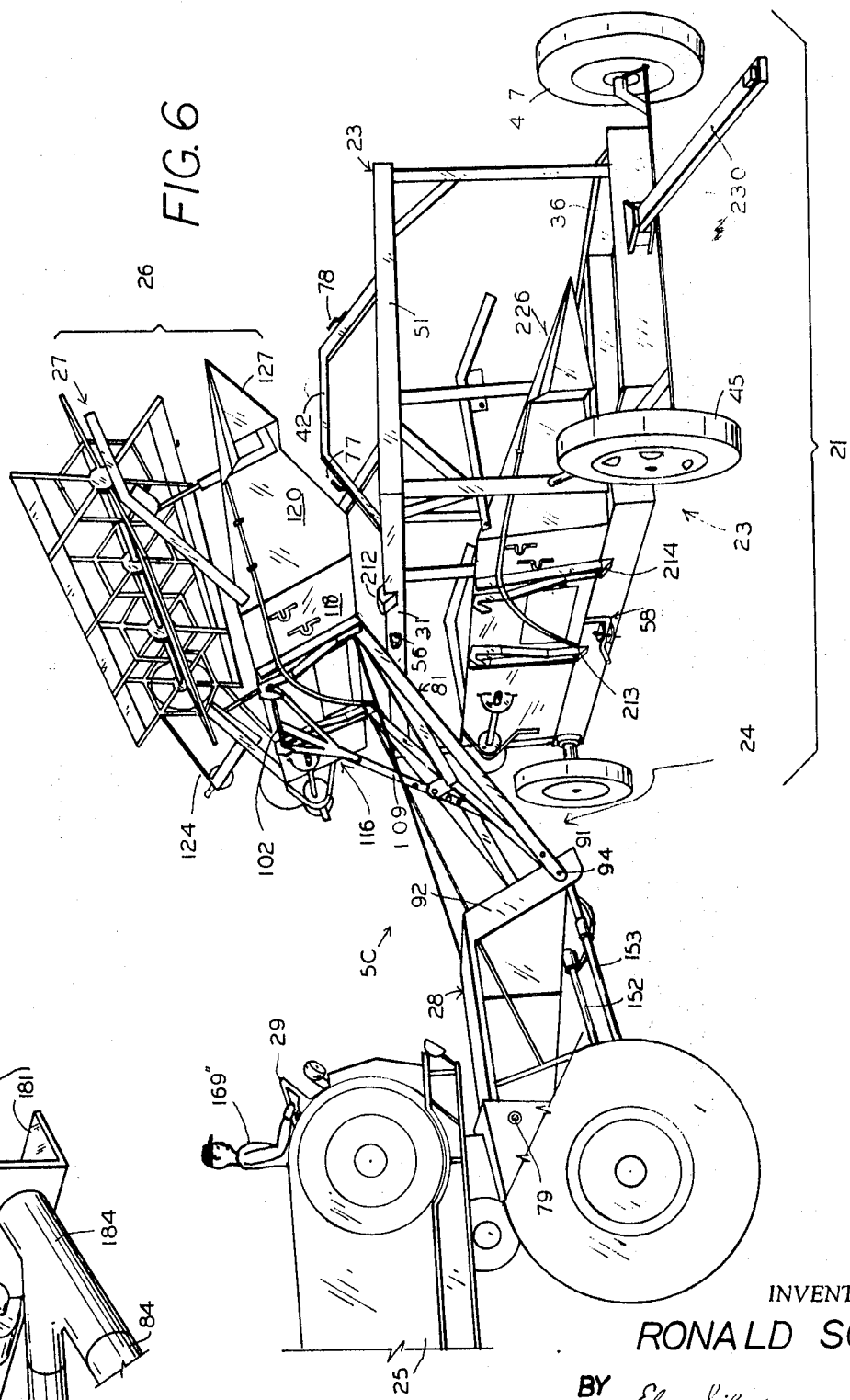
FIGS. 6 and 7 are perspective views of the loading frame assembly 24 and traveling frame 23 in an initial stage of the operation of loading a header on to the traveling frame.
Figure 5A:
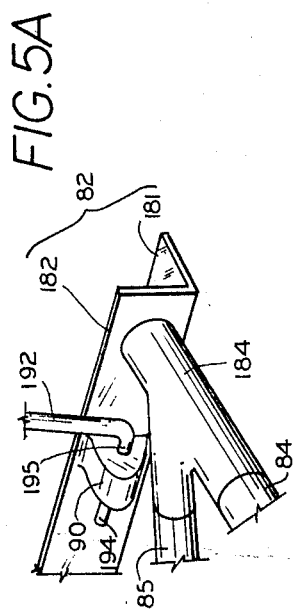
FIG. 5A is an enlarged view of ledge frame 81 in zone 5B of FIG. 5.
Figure 20:
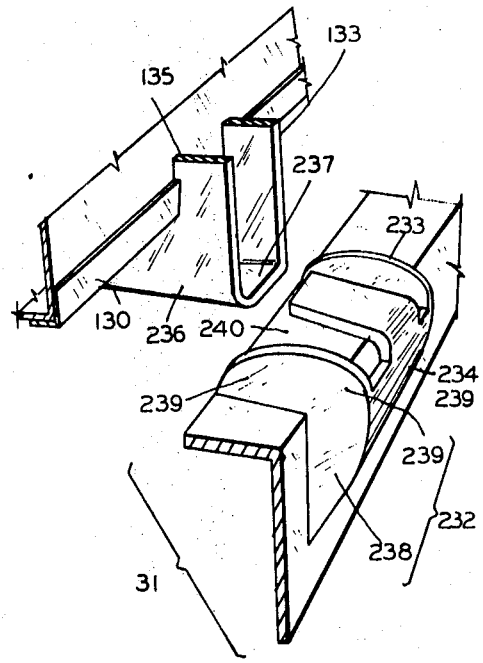
FIG. 20 is an enlarged diagrammatic oblique view of the header lug 236 and hook unit 212 as seen from the top and rear thereof in the position of points shown in FIG. 7.

Each of hooks 75 -78 has an upward and central opening and has a closed end or base laterally and downwardly and each hook is firmly attached at the lateral downward portion to the support therefor, as shown in FIGS. 6 and 20 and below described for hook 77.

Figure 11:
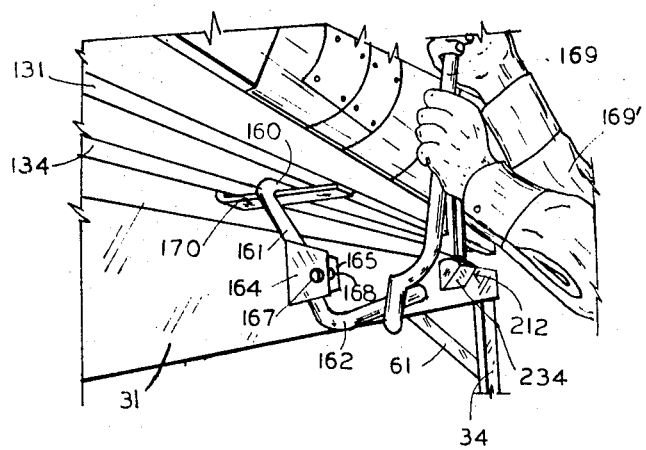
FIGS. 8, 9, 10 and 11 are sequential perspective views.
Figure 16:
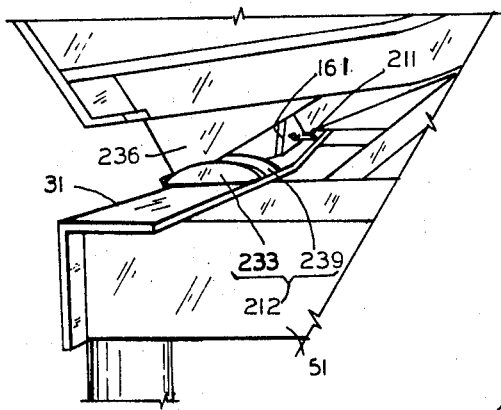
FIG. 16 is an enlarged perspective view, looking rearward along beam member 31 along the direction of arrow 16A in FIG. 4 in the assembly shown in FIG. 12 to show, the then slight elastic bend in member 32, and element 233 is broken away in part.

Each of the hook units as 211-218 is comprised, as shown for element 212 in FIGS. 4, 11, 16 & 20, of a pair of like longitudinally spaced parallel rigid vertical plates, 232 at rear, and 233 at front. Plate 232, as viewed from the rear of frame 23 and as shown in FIG. 11, is generally shaped like the arabic numeral seven (7); it has a lower portion 238, the outer edge of which is centrally and downwardly sloped and firmly fixed to outer side of member 31; upper portion, 239, of element 232 extends over the top surface of element 31 and is firmly fixed thereto. Portion 238 of member 232 is firmly joined at its lateral edge to a corresponding lateral portion of member 233 by a longitudinally extending rigid central backing element 234. A rigid locking lug or tongue 235 is attached firmly to and extends centrally from the top of element 234 and is spaced away at its front and rear from the top portions, as 239, of each of elements 232 and 233 and from the top surface of element 31, as shown in FIG. 16, and defines a locking recess 240.

A longitudinally extending laterally open U-shaped lug 236 extends downward and rearward from element 131 and is firmly attached thereto, and extends laterally of back wall 118 of header 26 and is firmly attached thereto; this U-shaped lug surrounds a lateral header locking recess 237 which is open laterally. The tongue 235 projects into recess 237 in the position of parts shown in FIGS. 12 and 16 while the bottom portion of lug 236 then projects into the space 240 below locking tongue 235 and between plates 232 and 233. FIG. 20 shows structural details referred to hereinabove.

The top right side member 31 has, at its center, a side latch assembly bracket 56 (shown in FIG. 18) and the bottom member 32 has at its center a latch bracket 58 for the bottom right side latch assembly (shown in FIG. 15); bracket members 57 and 59 on left members 35 and 36 respectively structurally correspond respectively to the brackets 56 and 58 and are found on the left side members 35 and 36 directly opposite assembly 58 and 56 on the members 32 and 31.

The loading frame 24 comprises a rigid ledge frame 81 and a supplemental frame 101 in operative combination. The frame 81 provides a base to which supplemental frame 101 is attached; the attachment is in part by permanent pivot joints and, in part, by a releasable latch assembly. Portions of of the frame 101 are kept in a fixed position relative to frame 81 during the engaged position of the latch and, on disengagement of the latch assembly, portions of the frame 101 are readily moved relative to the ledge frame 81. Frame 81 is attached adjustably yet firmly to the front frame 92 of elevator assembly 28 of a harvester, as 25, and, as below described, controllably moved thereby.

The ledge frame 81 comprises a rigid ledge member 82, and right longitudinal arms 83 and 84, rigid diagonal truss members 85 and 86. Ledge member 82 is formed of a straight steel angle; it is rigidly attached to and firmly supported by longitudinally extending left and right longitudinal members left arm 83 and right arm 84: arms 83 and 84 are joined by rigid diagonal truss members 85 and 86, member 85 extending from the rear of 84. Member 84 is firmly joined to the right-hand side of member 82, member 83 is firmly joined to the left-hand side of member 82, member 82 is joined to the sleeve for members 83 and 86. The rear of member 84 is joined to the rear of member 86, member 84 is joined to sleeve for members 85 and 82. Members 85 and 86 meet and are firmly attached to each other at a cross or junction 87 whereat they are welded together; thereby the members 82, 83, 84, 85 and 86 form a rigid flat frame located in a flat plane. Member 82 has a flat forwardly projecting plate portion 181 and, at its rear, a vertical rib upwardly extending portion 182 firmly joined together at their junction. Plate portion 181 extends in a plane parallel to a flat plane in which the bottom of members 82 through 86 lie. Rib portion 182 is perpendicular to portion 181 and these portions are continuously and firmly joined along their entire lengths. Near to its ends, the rear of rib portion 182 has a left ledge lug plate 91 and a right ledge lug plate 90 firmly fixed thereto. Externally of plates 90 and 91 Y-shaped sleeves 183 and 184 are firmly fixed to the rear of rib 182, (see FIG. 5) for attachment to and support by arms 83 and 84 respectively. As below described the supplemental frame 101 is pivotally supported on plates 90 and 91.

The front end of arms 83 and 84 are thus firmly attached to and support the rib plate 182, which in turn is firmly attached to and supports plate 181.

The rear end of each of arms 83 and 84 is firmly yet pivotably attached to pins 93 and 94 at the side and at the bottom of front face frame 92 of the elevator assembly 28 of the harvester 25, arm 83 by its pin 93 at the left side, arm 84 by its pin 94 at the right side; pins 93 and 94 being firmly fixed to frame 92. A strong wire cable 185 is pivotally affixed by a hook or pin 95, and extends from the top left front of front face frame 92 of elevator assembly 28 and extends diagonally forward and to the right and is firmly attached at its front to yoke 184: another like cable 186 is pivotally, by a hook or pin 96 attached to and extends from the top right of front of face frame 92 of elevator assembly 28 forward and leftward to the yoke 183 and is firmly attached at its front end to yoke 183.

Cables 185 and 186 serve to support and locate the frame assembly 81 relative to the elevator assembly 28 of the harvester 25. On each side of the front end frame 92 of the elevator is a hook or pin as 95 on the left side and 96 on the right side to which the cables as 185 and 186 respectively are joined. The cables 185 and 186 each have loops at the end thereof that engage the pins, as 95 and 96, therefor to hold the ledge frame 81 at the angle desired relative to face frame 92. The angle of the ledge frame 81 to the face frame 92 to a degree determines angle of the plate 181 at any given height to which the harvester 25 and elevator 28 may raise the header 26 engaged by the frame 24 on a given elevation of the elevator 28. The height to which plate 181 is raised on a given elevation of elevator 28 is also determined to a degree by that angle. The angle is determined by the length of the cables 185 and 186, which lengths are adjustable.

The supplemental frame 101 comprises, broadly, a pivotally mounted locking frame assembly 100 and a latch and release assembly 97 therefor. The locking frame assembly 100 comprises a straight horizontal locking member 102, like vertical members 103 and 104 and truss elements 106 and 107, a rigid longitudinal brace member 105. Horizontal member 102 is a straight rigid rod of uniform cross section. It is firmly joined close to its side ends by top left vertical frame members 103 and top right vertical member 104 as by welding. One, ear, portion (102.3) of rod 102 extends to the left of rod 103 and another ear portion (102.4) extends to the right of rod 104. The left rod 103 comprises a rigid vertical portion 193 and lower horizontal portion 191 integral therewith. The lower horizontal portion 191 pivotally engages a hole therefor, in the left ledge lug plate 91. The right rod 104 comprises a rigid vertical portion 192 and a lower rigid horizontal portion 194 integral therewith; the lower horizontal portion 194 pivotally engages a hole therefor, 195, in right ledge lug plate 90.

Longitudinal brace member 105 is a rigid plate also firmly attached, as by welding, to the center of 102 and extends rearwardly of that point of attachment. Member 105 is trussed by rigid truss rod members 106 and 107 which are firmly fixed and extend diagonally forward from a point on member 105 near to but spaced from the rear of member 105; member 106 extending diagonally from and firmly attached to the point of junction of members 102 with member 103 and member 107 extends to and firmly attached to the junction of members 102 and 104. An ear or yoke portion 108 of member 105 extends to the rear of the junction of members 106 and 107 therewith.

Latch and release assembly 97 comprises a rigid latch link member 109, latch pin plates 88 and 89 and a removable pin 98. A pair of rigid spaced apart vertical parallel longitudinally extending flat pin plates, right center latch pin plate 88 and left center latch pin plate 89, are attached firmly to the members 85 and 86 of assembly 81 near their intersection. The bottom of those plates 88 and 89, are firmly fixed to the tops of members 85 and 86 at their intersection at junction (or "X") 87. Latch link member 109 is a straight elongated rigid bar that fits loosely between plates 88 and 89 and has a plurality of equal sized parallel transversely extending holes as 110, 111, 112, 113 and 114 in a longitudinally extending series along the length of member 109.

A lock and release pin 98, passes through a hole therefor in each of the plates 88 and 89 and through one or another predetermined hole in link member 109 of the supplemental frame 101. One end of a cable 99 is attached to one end of the pin 98 for ready removal thereof and the other end of the cable is attached to member 83 of frame 81. Pin 98 is removable.

Fork portion 108 of member 105 is provided with a pivot pin hole for fixed location of pin 115 providing pivotal engagement of assembly 100 with the front end of link member 109. Pin 98 fits into one of holes 110–114 and the holes in plates 88 and 89 and, with members 109 and 108 pivotally connected, locates the member 102 relative to the frame 81 as desired.

As shown in FIGS. 6, 7, 8, 12, 13 and 17, the conventional header 26 comprises a pan 116, a sickle 122 and reel 27. More particularly, the pan 116 has an imperforate sheet metal bottom portion 117, a back wall 118, which back wall has central discharge opening 119, imperforate left sidewall 121, an imperforate right sidewall 120. The sickle 122 has a drive mechanism (as 225) attached in part at its bottom for reciprocating upper and lower teeth portions thereof in a rectilinear path for the cutting operation thereof. The reel 27 has attached thereto a drive assembly 124 and a pivotal adjustable support assembly for the location of the reel in proper relation with the bottom and front and sides and other portions of the pan 116. The left and right spacers 126 and 127 located on the front of walls 121 and 120 respectively serve to locate the pan and sickle with respect to the ground over which the apparatus 26 is moved by the harvester 25 in a normal harvesting operation of the harvester and header combination. The header 26 also comprises an auger 128 located at (the rear of the bottom portion of the pan or) the bottom of the back portion 118 of the pan 116. In order to maintain the orientation of its elements the header is provided with a rigid top rear longitudinal element 130 which is firmly attached to the backwall 118 and supports and locates the elements of the header with respect thereto as well as a rigid bottom longitudinal member 131 fixed to the bottom of pan 116. Left vertical member 132 and right vertical member 133 firmly join the members 130 and 131 to form a rigid back structure therefor the support of the header. A front rigid longitudinal member 129 is located to the rear and below yet relatively close to the sickle assembly 122 (as in FIG. 7) to provide for the support of the parts thereof so that, in normal operation of the sickle of the header the parts thereof will have their relative alignment maintained.

A vertical right hook support 135 and a vertical left hook support 136 are firmly attached to the rear surface of the back of the pan 116 on the right and left side respectively of the opening 119 and to longitudinal structural frame members as 130 and 131. A downwardly open rigid hook 205 is firmly fixed to the hook support plate 135; a similar downwardly open rigid hook 206 is firmly fixed to hook support plate 136. Each of the hooks as 205 is composed of a rear, downwardly projecting rigid arm 207 which, at its top is firmly attached to and supported by a forwardly projecting base 209; the base is firmly connected at its forward end to a rigid vertical hook support bar as 135. The space 208 between the front of arm 206 and rear of bar 135 houses the bar 102 of assembly 24 during engagement and support of the header as 26 in the loading operation shown in FIGS. 6–8. Hooks corresponding to hooks 205 and 206 in header 26 on other headers as 226, 227 and 126 are correspondingly engaged by the bar 102 of assembly 24 when loaded thereby on to assembly 23.

The upper right side latch assembly 156 comprises hook unit 159 and top side latch assembly bracket 56. Bracket 56 comprises two parallel spaced-apart bracket plates 164 and 165 each firmly attached to the outer surface of upper side member 31. The hook unit 159 comprises in series connection, as shown in FIG. 11, a longitudinally and horizontally extending hook arm, 160, a lock arm 161 extending vertically and attached at its top to one end of the hook arm 160, and a pressure arm 162 extending horizontally and transversely and so at right angles to the direction of the arm 161 as well as 160.

Figure 18:
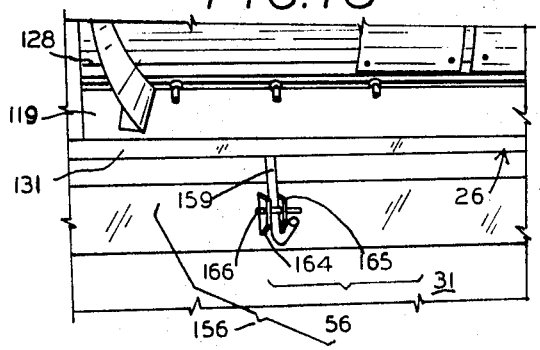
FIG. 18 is an enlarged side view of zone 11A of FIG. 12 after a header as 26 is attached to the frame 23.

A horizontal (as shown in FIG. 11) rigid latch base arm 170 is firmly connected to bottom rear of header 26 between elements 131 and 134 and firmly attached thereto. A wrench 169 is applied by hand of operator 169" to pressure arm 162 as shown in FIG. 11 to resiliently bend the lock arm 161 and also to bend the member 31 as shown in FIGS. 11 and 16. A rigid steel locking pin 166 is then located outboard or laterally of arm 161, in holes 167 and 168 in bracket plates 164 and 165 respectively, as shown in FIG. 18. The lock arm 161 is then located between rear bracket plate 164 and a front bracket plate 165 of assembly bracket 56 and is held in such locking position by the pin 166 and outer upper (left as seen in FIG. 16 right as seen in FIG. 11) edge of member 31.

The lock arm 160 engages brace 170 and resiliently yet forcefully holds it downward and laterally. In so doing the plate 31 is resiliently bowed, as shown in FIG. 16, the header 26 is thus firmly yet resiliently held to frame 23 in the traveling and loaded position of units shown in FIGS. 12 and 13.

The lower right side latch assembly 257 comprises hook unit 259 and bottom side latch assembly bracket 57. Bracket 57 comprises two parallel vertically spaced apart bracket plates 264 and 265 each firmly attached to the outer surface of connection, as shown in FIG. 15, a longitudinally and horizontally extending hook arm 260, a lock arm 261 extending vertically and attached at its top to one end of the hook arm 260, a pivot link 263 and a pressure arm 262 extending horizontally and transversely and so at right angles to the direction of the arms 263, 261 as well as 260, 263 is below 260.

A horizontal (as shown in FIG. 11) rigid latch base arm 270 is firmly connected to bottom rear of header 226 between longitudinal elements as 131' and 141' on header 26 and firmly attached thereto. Structural pressure is applied by foot of operator 169 to pressure arm 262 as shown in FIG. 14 to resiliently bend the lock arm 261 and also to bend the member 32 as shown for element 31 in FIGS. 11 and 16. A rigid steel locking pin 266 is then located outboard or laterally of arm 261 in holes 267 and 268 in bracket plates 264 and 265 respectively, as shown in FIG. 14. The pivot link 263 is then located between lower bracket plate 264 and an upper bracket plate 265 of lock assembly bracket 57 and is held in such locking position by the pin 266 and outer upper edge of member 32.

The lock arm 260 engages brace 270 and resiliently yet forcefully holds it downward and laterally. In so doing the beam 32 is resiliently bowed, as well as 263; the header 226 is thus firmly yet resiliently held to frame 23 in the traveling and loaded position of units shown in FIGS. 12 and 13.

In general the header (or grain table) 26 on grain harvester 25 is conventionally adjustably mounted on the body of the combine (or combined harvester-thresher) to be maintained parallel to the ground as well as at a desired height above the ground. More particularly, the header (or grain table) 26 is supported on a floating elevator as 28. Such elevator as 28 is pivotally mounted as at pivot 79 on the frame of the harvester; the position of the front opening, surrounded by its frame 92, of the elevator 28 is adjusted vertically relative to the body and the frame of the harvester by conventional hydraulic left and right piston assemblies as 152 and 153 respectively; one end of each such piston assembly is supported on and attached to the frame of the combine 25; the other end of each such piston assembly is operatively attached to the elevator near to the front frame 92 of the elevator 28. A source of high-pressure hydraulic fluid is operatively connected to each such piston assembly and controlled by a hydraulic control 29 on the combine 25. The extension of the shafts (as 154) of assemblies 152 and 153 by operator as 169' by the controls 29 raises elevator assembly 28; adjustable location of the height of the sickle on the header at a position desired between the height of 2½ inches over the ground to 33 inches above the ground is thereby achieved.

The length of frame 101 measured from pivot pin as 94 to bar 82 is 6 feet in embodiment shown in FIGS. 6–10; this is about 150 percent of the length of frame of elevator 28 from its point of pivotal support 79 on frame of combine 25 to the front frame 92, (4 feet in embodiment shown).

Figure 7:
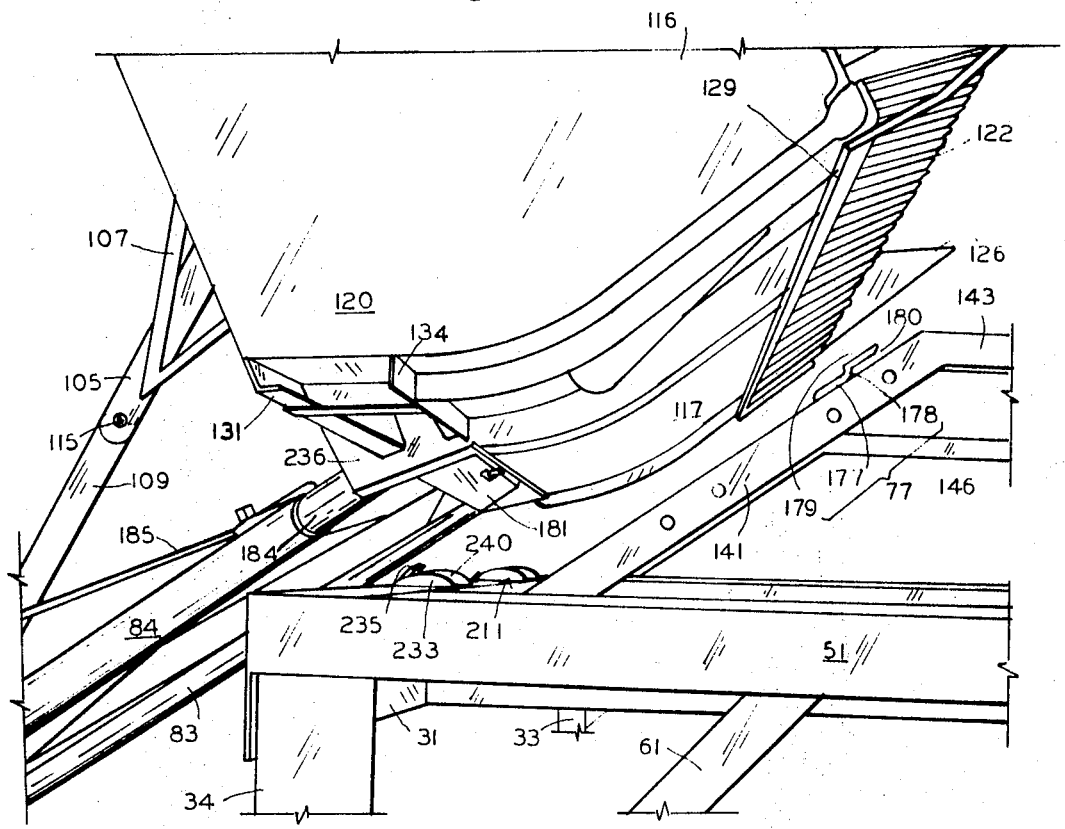
Figure 8:
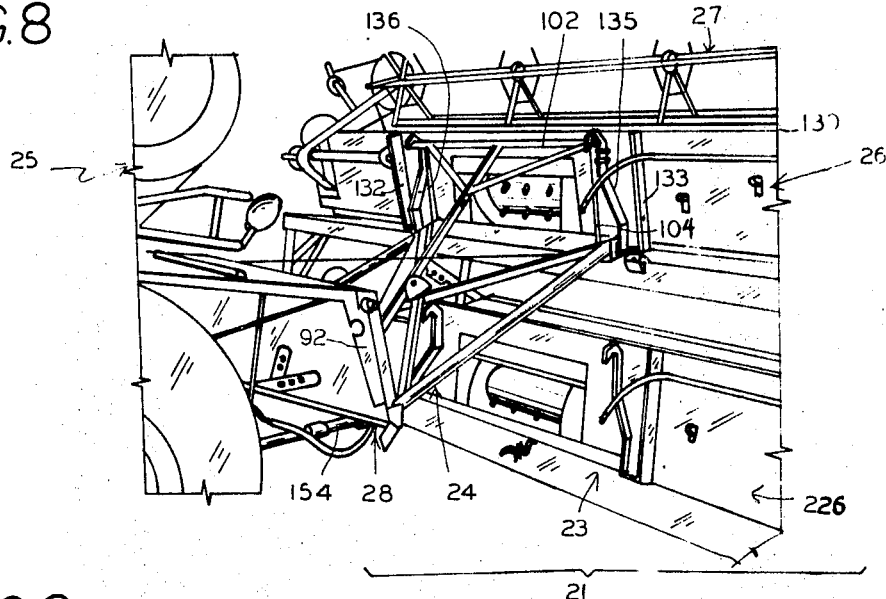

There is thereby conveniently and readily achieved an elevation of the bottom portion (as member 131 as shown in FIG. 7) of the header, as 26, carried, as shown in FIGS. 6, 7 and 8 by frame 24 of 6 feet above the ground (on which ground the traveling frame 23 and the combine 25 are located.)

Pin 98 is a smooth tapered rigid shaft also called a drift pin and is readily jammed into one hole therefor as in plates 88 or 89 and thereby firmly located during the period for which it is used to locate link 109 at a desired angle relative to the plane of ledge frame 81.

The distance of rod 102 to the top of plate 181 measured in direction parallel to back 118 of header 26 is only very slightly (1/16 to ⅛ inch) less than the distance from bottom of rear face 118 of header 26 to the top of space 208 in a hook therefor as 206, thereby the ledge frame 81 supports the header 26 during the movement and support of the header illustrated in FIGS. 6–8; although the frame 101 provides tilt control thereof. Also the length of arms 192 and 193 from the pivotal location thereof on member 182 is such that the arm 102 fits securely into each space, as 208 in each hook as 206, forward of each downwardly projecting arm, as 207, on each hook as 206 of the header, as 26, supported thereby in the loading and unloading operations illustrated in FIGS. 6, 7 and 8.

Stages in the operation of loading a header as 26 on the traveling frame 23 are as shown in FIGS. 6 through 18. As a first stage in such operation the elevator 28 is disconnected from the header 26. The front frame 92 which surrounds the entry opening into the elevator 28 is then operatively attached to loading frame 24 by the pins 93, 94, 95 and 96 and cables 185 and 186. The angle of the length of vertically extending members 192 and 193 of supplemental frame 101 to the flat plane of members 82, 83, 84, 85 and 86 forming frame 81 is set by firmly yet releasably locating one of the holes as 110–114 in member 109 relative to the plates 88 and 89 on ledge frame 81 by locating pin 98 in the holes on plates 88 and 89 therefor and through the desired hole as 110–114 in link 109.

Figure 10:
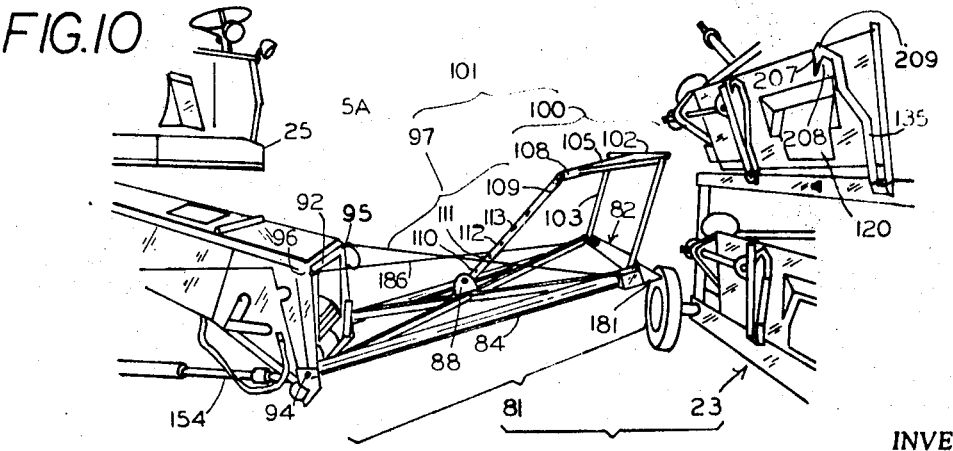

The angular disposition of the rod 102 to ledge member 82 of frame 24 is thus determined; the angular disposition of members 82 and 102 is set to an array of frame 101 and 81 as is shown in FIG. 10 so that engagement of the members 102.3 and 102.4 with hooks 205 and 206 of a header as 26 on the ground initially elevates the top rear edge of the header and then pivots the rear of header 26 about the front end of the header until the rear bottom edge of the header is engaged by the plate 182 of member 81; then the plates 181 and 182 meet the bottom of the rear face 118 of header 26; thereafter, by controlled extension of pistons 152 and 153 and, thereby, continued elevation of elevator 28 and frame 24 the header 26 is supported over the ground and elevated to a height sufficient to locate the bottom portions thereof, as shown in FIGS. 6 and 7, above the height of the support and locking members as 75 and 77 therefor on frame 23. The header 26 is then moved centrally over frame 23 so that the hook members as 77 and 75 are located laterally of the members on header 26 which they are intended to engage in the position of parts shown in FIG. 12 (in which the traveling frame 23 supports the plurality of headers as 26, 226, 227 and 228). This movement of the header 26 transverse to the length of the traveling frame 23 is accomplished by movement of the harvester 25 forwardly along its length: thereby the power and strength of the harvester traction unit and frame are then used (via frame 24) to manipulate with ease, accuracy, rapidity and reliability the header 26 relative to the frame 23. Thereafter the header is moved downward until its lower surface rests on the top of frame 23 centrally of the hooks as 75 and 77, (for the location of the upper right-hand header, as 26, shown in FIGS. 12 and 13).

The amount of angle relative to, or tilt of, (a) the plane passing through the lengths of center of member 102 and length of the intersection of plates 181 and 182 of member 82 relative to (b) the plane of front frame 92 of the elevator 28 is determined by the location of pin 98 in link 109. This tilt is chosen so that, as shown in FIG. 8, the header 26 front longitudinal structural member 129 initially contacts the frame 23 centrally of the locking hooks therefor as 75 and 77 substantially at the same time the rear edge of member 131 meets the frame 23 centrally of the centrally projecting hook members therefor (as 235) in units 211 and 212 therefor.

Figure 17:
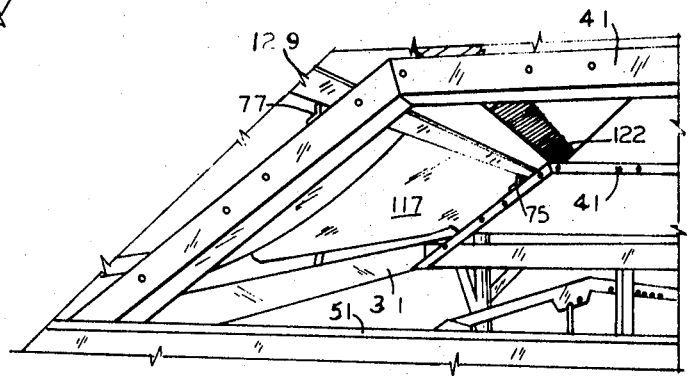
FIG. 17 is a perspective view upward and rearward along direction of arrow 17A of FIG. 12 showing details adjacent the bottom of the header 26 supported on the upper level of the loaded traveling frame assembly 23 as shown in FIG. 12.

The harvester 25 is then moved rearwardly (rearwardly as shown in FIG. 6) and the elevator 28 lowered; thereby the header 26, supported on ledge member 82 and balanced by the engagement of bar 102 with hooks 206 and 207 is moved easily and reliably and accurately downward and laterally of frame 23. The locking arm as 179 of each of the hooks as 75 and 77 then engages member 129 as illustrated in FIG. 17 for header 26 and tongue 235 of member 212 engages the locking lug, as 236, located on the rear and bottom of header 26. A similar tongue on member 211 locks with a similar locking lug, as 236' on the left (as shown in FIG. 12) side of the header as 26. Header 26 then rests on the frame 23 held in place by hooks 75, 77, 211 and 212.

When the hooks 75, 77, 211 and 212 rest in header 26 matching components lateral motion of header 26 off frame 23 is thereby prevented. The header as 26 so loaded is thus stably held by frame 23; then frame 24 may be safely, easily, reliably and rapidly detached therefrom and the header as 26 (or 227) then safely, easily, readily and reliably locked to the frame 24 by a latching assembly as 156.

Figure 9:
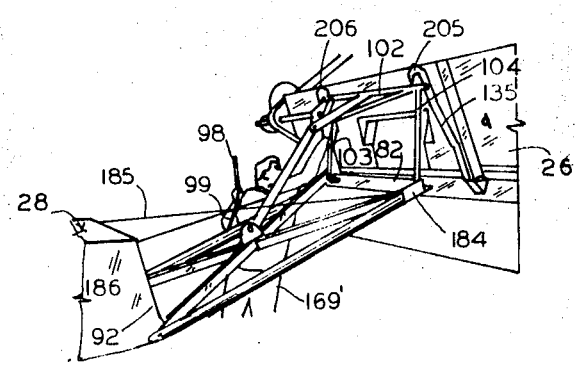

The frame 24 is then detached from the header 26 as follows; the latch pin 98 is first removed from the hole therefor in latch pin plates 88 and 89. The harvester frame 25 is then moved rearwardly (to left as shown in FIGS. 8 and 9). On such rearward movement of the frame 24 relative to the stationary frame 23 and header 26 thereon, with the link 109 released from plates 88 and 89 (by removal of the pin 98) each arm as 207 of each hook as 206 on the header restrains the bar 102 from lateral motion following the harvester 25. The ledge frame member 82 may however then be moved laterally. It may be moved laterally because U-shaped members as 236 are, as shown in FIG. 9, firmly seated in hook members as 211 and 212, and these U-shaped members are firmly attached to the header frame member as 135 and 136, as shown in FIG. 12. These rigid structural frame members 135 and 136 support the header 26 with the bottom surface 117 of the header 26 spaced slightly but definitely, i.e. about 1 inch, above the top surface of element 31 as shown in FIG. 17 and, the height of such space is greater than the thickness of member 181. The distance between hook members 211 and 212 (and 213 and 214) slightly but definitely greater than the length of members 181 and 182; so that the vertical and lateral extension of hook members as 211 and 212 (as well as 213 and 214) does not interfere with the manipulation of the header as 26 on the frame 23 by the combination of harvester 25, elevator 28 and loading frame assembly 24. After ledge member 82 has been moved laterally of frame 23 by the above-described release of link arm 109 and lateral movement of frame 24 sufficiently to no longer be above the bracket therebelow, as bracket 56, i.e. when frame 81 and 101 and 23 and header 26 are in positions as shown in FIG. 9, the frame 24 is lowered by pivotally lowering the frame 28 about its pivot 79; the member 102 may then be, and is then lowered from and moved out of the space as 208 within each hook as (205 and) 206 to a height as shown in FIG. 10.

The frame 24 may then be moved laterally and away from the assembly 23 to the position as shown in FIG. 10 that is spaced away from traveling frame assembly 23.

The hook units are handles 159 and 259 are detachable from the assemblies in which used and are kept in boxes as 200 and 201 on the lower frame of the frame 23; this permits that the headers may be unloaded from the frame 23 at one point on a large tract of land to be harvested, following which the header is attached to a combine as herein above described and thus emptied traveling frame 23 be moved to another distant point on the field for future loading without any locking mechanism loosely swinging therefrom; this avoids loss of such relatively small parts as well as damage to any personnel who may be otherwise struck by any such moving part.

After removal of frame 24 from header 26 the header 26 is locked to the frame 23 by the latch assembly 156 as follows: the lock arm 160 of the hook unit 159 is located in a hole therefor in base arm 170, lock arm 161 is located between bracket plates 164 and 165. An operator 169' applies force as shown in FIG. 11 to rotate arm 162 in a clockwise direction as shown in FIG. 11; the arm 161 is bent slightly around the upper edge of member 31 and, as shown in FIG. 16, the member 31 is bowed slightly, i.e. about ½ inch for the 18½-foot span in the particular embodiment shown. Lock arm 161 is then held in position by a rigid pin 166 the shaft of which fits freely into the holes therefor in plates 164 and 165. Pin 166 is preferably a threaded bolt: the head does not pass through the holes, the shaft thereof does pass through. A nut on the threaded portion and a cotter pin prevent accidental loosening through vibration.

To disengage a header as 26 from the traveling frame assembly 23 the steps for loading that header 26 on the assembly 23 are performed, speaking generally, in reverse order from the steps above described for loading the header 26 on the traveling frame assembly 23.

Firstly, the latch assembly as 156 for the header as 26, is unlocked or released by, as shown in FIG. 11, forcefully pressing downward on arm 162 as with a wrench as 169 thereby releasing pressure on pin 166 and then removing pin 166 from plates 164 and 165; the member 159 may then be rotated counterclockwise (as seen in FIG. 11) about arm 160 to separate unit 159 from contact with member 31. Unit 159 is then withdrawn from engagement with member 170. After unit 159 is removed from connection with brackets 164 and 165 bottom plate 181 of ledge frame 81 may be located in contact with the bottom and rear of header 26.

The component units of loading frame 24 are then arranged, generally as shown in FIG. 11 with bar 102 forward of (relative to forward end of harvester 25) ledge member 82, this position being determined by location of pin 98 in an appropriate hole, as 112, therefor in link arm 109. Frame 81 is firmly attached to front frame 92 of elevator 28 by locating each of pins 93 and 94 in the hole therefor at rear of members 83 and 84 respectively and locating and connecting the rear end of each of cables 185 and 186 on pins as 95 and 96 therefor respectively, at the top of frame 92.

The thus arranged and located frame 24 is moved to locate the length of locking member 102 in a line that is parallel to and below a straight line joining the space, as 208, in each hook as 205 and 206.

As frame assembly 23 is movable along its length on its wheels 44–47, location of the front of frame 24 relative to the header 26, which is firmly located on frame 23, is easily and reliably and exactly effected to also bring ears 102.3 and 102.4 directly below hooks 205 and 206. Frame 24 is then raised by actuation of the pistons 152 and 153, as determined by hydraulic control 29 on the combine 25, to elevate the front frame 92 of elevator 28, and ledge frame 81 attached thereto. The ear members 102.3 and 102.4 are thus brought into engagement with hooks 205 and 206. Pin 98 is then removed from its locking engagement with plates 88 and 89 and link 98; and the bar 102 is then pivotally movable about the points of attachment of portions 194 and 191 of frame members 104 and 103 with lug plates 90 and 91, relative to ledge member 82.

Combine frame 25 is then moved toward frame 23 while supporting its elevator 28 and the frame 24 in an elevated position from a position of parts as shown in FIG. 9. The plate 181 is thereby moved under header 26 between the portions thereof (135 and 136) held by hook units 211 and 212, and the rib plate 182 engages the back, 118, of the header 26.

The pin 98 is then placed in holes in plates 88 and 89 therefor and a hole as 111 in link 109. This fixes the spatial relation of link 109 to member 105 and fixes the spatial relation of member 102 to member 82.

A further slight upward motion of frame 24 with header 26 operatively connected to frame 24 by members 82 and 102 is then effected. The hooks 211, 212, 75 and 77, through their connection with frame 23, limit the upward motion of the header 26; this resistance is readily seen and heard by the operator 169" by the sound created when the upper portions of the hook elements 75, 77, 211 and 212 meet with the elements of header 26 theretofore below such hook elements.

A further slight forward motion of unit 25 with elevator 28 and frame 24 and header 26 connected in series causes the hook units 211, 212, 75 and 77 to lose their connection with the frame 23. This release is readily seen by eye and by ear of the operator 169" in regard to hooks 211 and 212 and, because of the fixed spatial relations of the neighboring lateral and central hook elements, as 212 and 77, on observation of the release of the lateral hook, as 212, the corresponding central hook, as 77, is concurrently released.

A further upward motion is then given to frame 24 with header 26 connected thereto, and the relation of tractor unit 25, elevator 28, frame 24, header 26 and traveling frame 23 shown in FIG. 6 is achieved, i.e. the header 26 is raised completely off the frame 23. Thereupon, (i.e. or promptly thereafter) the unit 25, with elevator 28, frame 24 and header 26, all disposed as in FIG. 6 move laterally away from the traveling frame assembly 23. The frame 24 is then with header 26 supported thereon lowered slowly toward the ground while attached to elevator 28, which is slowly rotated clockwise (as seen in FIG. 6), even after the front end of the header rests on the ground, until there is no vertical support supplied to the header by the frame 24. Thereupon in the same general manner as above described for the separation of frame 24 and header 26, as shown in FIG. 9, during location of the header 26 on frame 23, the pin 98 is first removed from its location in plates 88 89 and link 109, and thereafter, the unit 25 moves backward from the header 26 while the member 102 is held forward by hooks 205 and 206, until member 102 falls forward or until the frame 81 is drawn so far to the rear that the height of the member 102 over member 82 is less than the height of hooks 205 and 206 over the bottom surface 117 of the header 26. Thereupon (or next) the frame 81 is lowered so that the member 102 is located below and disengaged from the hooks 205 and 206; thereupon (or next) the unit 25, with frame 24 connected thereto is moved to its rear and, thereby, the header 26 is separated from the frame 24. The loading frame 24 may then (by disconnecting pins 93, 94 95 and 96 from frame 92) be easily and rapidly disconnected from the front frame 92 of the elevator assembly 28. Thereupon (or next) the elevator assembly 28 is operatively connected to the header 26 for operation as a combine.

The time for removing a header as 26 or 226 from the frame 23 (in the fastened position shown therefor in FIG. 12) to a stable rest position of that header on the ground is from 2 to 3 minutes. The time for locating the header as 26 or 226 in the frame 23 from a stable position of that header on the ground is also about 2–3 minutes; in each case only two operators are required, although three operators are more convenient and preferred; one operator as 169" actuates the controls of the unit 25; another as 169' controls the pin 98 and aligns elements of frame 24, the third (not shown) assists the second operator as needed. The frame 23 has hooks 77, 212, 211 and 75 located so that the weight of the header 26 is located with its center of gravity about 1 foot central of the member 31 (or 35 for header 227). Thereby in the position of the header 26 raised over the frame as shown in FIG. 6, the ledge member 82 is substantially directly below the center of gravity of the header (in that position).

In operation the trailer assembly 23 moves over the unpaved roads and fields. During such travel the relationship of the hollow box composed of members 38, 51, 34, and 49 and the rear box composed of members 33, 37, 50 and 48 is, relatively, as shown in FIGS. 2 and 3, namely, that while one part (the front) may be on a level portion of the road as shown in FIG. 2 the rear (as shown in FIG. 2) will not be. Additionally, when the rear end is on the level, the front end as in FIG. 3 may not be. The traveling frame 24 has no particular resistance to torsion inasmuch as it is an "open" frame, i.e. there are no diagonal members extending, for instance, from the right rear bottom corner to the front left top corner or from the front left bottom corner to the rear left top corner or from the front left bottom corner to the right rear top corner, blocking the front end of the sides or the rear openings to the volume bounded by members 31, 32, 35 and 36; therefore there is no prevention other than the stiffness of the members 31, 32, 35 and 36 to the prevention of this distortion of the front of frame 24 relative to the rear thereof. Nevertheless, because of the method of attachment of each header apparatus as 26, 226, 227 and 126 to the traveling frame 24 as provided for in this invention, there is no permanent distortion of the header 26 nor the components thereof because of this twisting motion. The alignment of header members directly connected to each sickle mechanism, as 22 of each header as 26, in particular is never other than straight; thereby that reciprocatory mechanism is not harmed during transport on frame 24.

The hooks 71, 72, 73, 74 are so oriented on the support therefor on the frame 24 that the very great power of the machine 25 is readily used to lift and place loosely lock the header 26 in place on the frame 24. Further, the hooks 148', 149', 150' and 151' on members 148, 149, 150 and 151 respectively are oriented on the lower frame in a manner corresponding to 71–74 on the upper members 41 and 42 so that the powerful machine 25 may be used to lift and place and lock the header as 126 in place as shown in FIGS. 8, 12, 13, 14 and 15 on the frame 24; further still, each of these hooks points centrally and has a greater vertical extension than the thickness of the member to which it is to be held and all have a free end or tongue (as 179) pointing or extending in the same relative direction, namely, to the center and upward so that the power of the machine 25 may be used to release and move and lower the unlocked header 26 from the frame 24. The final locking of each header after in proper position on frame 24 is accomplished by hand as shown in FIGS. 11 and 14 but this is the only hand operation that is required, the heavy work all having been performed by the machine 25 and the elevator assembly 28 used therewith as above described.

The frame 23 provides for each header to be supported thereby, as 26, 228, 226, and 227, a hook element at the side member 31, as 161, and two hooks as 212 (and like other hooks on members 32, 35 and 36 as 214 and 213 on 32) such header is held at ears thereof, (as ear 236 of header 26) by element 234 of unit 212 as shown in FIGS. 7, 8, 9 and 11. This holding is insufficiently rigid to prevent some shifting by the elements as ear 236 within unit 212. This shifting would be transverse of the length of frame 24, i.e. transverse to the length of member 31 but not, especially in view of holding by element 161, sufficiently to disengage from the tongue as 179 or 235 (see FIG. 7). On twisting of the frame 23, the header 26 is readily shifted, centrally or laterally to a limited degree at each ear as 211, 212 (and 226 at 213 and 214) and the frame 26 may also be at that same time readily shiftable forwardly or rearwardly at ears 76 and 77 although held down firmly at 56 by pin 161 and vertically supported at ears as 211 and 212. Such support, permits lateral or longitudinal motion of the beam restricted by member 179 atop member 129 and 141 therebelow. Vertical motion of the beam as 129 is restricted by member 179 which is located above the top of member 129 and by member 141 which is located below and supports member 129. The space as 180 on each locking member as 77 is far higher than the thickness of the member 129 held between such arm 179 and the member 141 therebelow. Accordingly, the member 129 is freely movable longitudinally of the frame 24 and even though it is supported vertically and has its upward motion limited. This permissibility of "working" or shifting of each of the headers as 26, 228, 226 and 227, which is accomplished by the arrangement of such ears as 71–74 on this apparatus, permits an "open" frame to be used. Because of its "open" character frame 24 can twist and absorb some shocks. Also because the frame is "open" the volume enclosed thereby is extremely well utilized by the headers; it will be noted, as shown in FIG. 13, that there actually is an overlapping of portions of one header as 26 and another as 227 and also portions of headers as 228 and 227. Nevertheless, the frame 24 is relatively flexible and not disturbed by shocks met in travel over field and unpaved road. Because each header as 26, 228, 226 and 227 is held firmly at one point and allowed to shift at all its other points of support as at 236, 75, 77, 211 and 212 no buckling of the relatively thin flat metal sheets of which each header is formed is impressed on that structure.

Permitting the longitudinally extending frame-engaging member 129 of the header as 126 to move longitudinally of frame 24 as well as to have some limited transverse motion avoids any harmful twisting stress thereon. Nevertheless, the resilient hold provided by each locking member as 161 and 261 on each header held thereby presents undue rattling that might cause wear or fatigue. Accordingly, by this combination of elements there is provided an apparatus which permits two men to readily handle each of four headers, moving them rapidly on to the apparatus for the transport thereof, which transport is accomplished without any damaging stress and resultant strain on the structures. Further, four of these headers may be located on one frame so that there is a minimum of length of handling apparatus.

There is a benefit to having four headers on one frame as 24 rather than one because not only is there, as above described, a firm support by longitudinal members as 31, 32, 35 and 36 applied to each header but also there is cooperation between these longitudinal members at the same level to support the back "spine" of each of the headers while allowing some play in a vertical motion of the front end of each header by a member attached as by 41 and 42 to a parallel longitudinal member as 35. The frame 24 provides to each of a plurality of headers support of longitudinally extending member as 31 to which the header is held firmly only at one point (161) while allowing some shift at four other points of support as 211, 212, 75 and 77 therefor; thereby the top level of frame 24 may be used to safely transport headers along a rough unpaved road with the comparatively light structure shown; also, locking of the to be transported header to the support frame therefor is accomplished by hand only by a locking manipulation at one point exterior to the header handled and similarly, a release of the header from a lock position to an orientation relative to the support therefor whereat the power of a combine may be used is also conveniently accomplished by only one manipulation from the exterior of the frame. Thereby the headers are conventionally and safely manipulated and reliably and safely held in a manner particularly advantageous for movement over rough unpaved roads and fields.

The combine 25 has a 265 cu. in. internal combustion engine motor of about 75 brake horsepower (at 1,685 r.p.m.) to move the wheels thereof and power the hydraulic system above discussed in relation to loading of the headers as 26 on the frame 23. Movement of the header 227 to position shown in FIGS. 12 and 13 and therefrom is accomplished as above described for movement of header 26 to its position on frame 23.

The movement of headers 226 and 228 to and from the position shown on frame 23 is accomplished in the same manner as above described for header 26 and 226 except that the action of the locking mechanism (257 for header 226) is as above described therefor.

The difference between the latch assemblies shown in FIGS. 14 and 15 on one hand and in FIGS. 11 and 18 on the other as above described are illustrative thereof different assemblies, the same locking assembly 156 or 257 could be interchanged, but the array shown is convenient for pulling down on an elevated wrench as 169 in FIG. 11, and for pressing down on a low member as in FIG. 14.

TABLE I

DIMENSIONS OF APPARATUS SHOWN IN FIGS. 1–20

| From | To | Description | Measurement |
| --- | --- | --- | --- |
| 33 (rear) | 34 (front) | overall length | 18' 6" |
| top of 32 | 31 bottom | opening | 43" |
| 31 bottom | 31 top | height of 31 | 5" |
| 31 left | 31 right edge | web of 31 | 2" |
| 32 bottom | 32 top | height | 8" |
| bottom of 32 | top of 31 | overall height | 56" |
| 45 | | wheel diameter | 30" |
| 34 | | diameter | 3" |
| 33 (left edge) | 37 right edge | overall width | 72" |
| 259 | | diameter | ⅝" |
| 159 | | diameter | ⅝" |
| 31 thickness | | plate thickness | ¼" |

These structural elements are made of steel (except of course tires), where elements are referred to as firmly joined together such joining is by welding.

Figure 19:
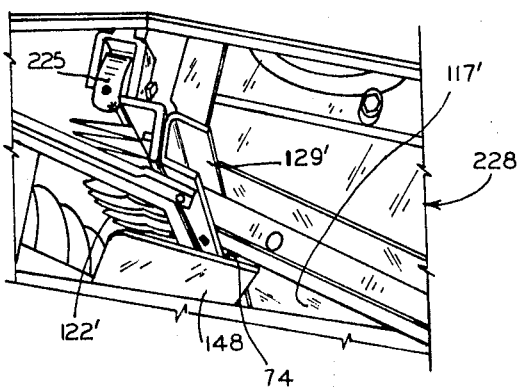
FIG. 19 is a perspective view along direction of arrow 19A of FIG. 5 along the bottom of the header 226 supported on the lower level of the loaded traveling frame assembly as shown in FIG. 12 and FIG. 13.

The pan of each of headers 228, 227 and 226 are identical to pan of header 26 above described and parts 117', 122', 124' of header 228 correspond to parts numbered 117, 122 and 124 respectively of header 26; a portion of the conventional sickle drive 225 of header 228 is illustrated in FIG. 19 in its relation to the hook support 148 holding and supporting the front end thereof in the same manner as the front end parts as 122 of header 26 are held and supported by members shown in FIG. 7 and as shown in FIG. 17.

I claim:

1. A tractor loading assembly comprising, in operative combination, a combine tractor with engine and elevator; a rigid ledge frame, pivot points at the rear thereof, a forwardly projecting rigid horizontally extending ledge at the front thereof, said pivot points pivotally connected to said elevator; a supplemental frame pivotally mounted on said ledge frame near to the front thereof, said supplemental frame comprising a locking frame and a latch and release assembly therefor; said locking frame assembly comprising a rigid horizontally extending locking rod and vertical support means fixedly attached thereto at their top and pivotally attached to said ledge frame at their bottom, a first rigid link firmly attached to said locking rod and projecting rearwardly therefrom; said latch and release assembly comprising a second rigid link pivotally attached to the rear of said first rigid link attached to said locking rod; removable locking means releasably attaching said second link to said rigid ledge frame at a point on said second link spaced away from the point of attachment thereof to said first link in operative combination with a traveling frame means for supporting a combine header for off-the-road and unpaved-road travel comprising a frame, said frame supported on wheels, said frame comprising a first longitudinal beam rigid in the vertical plane, first holding means firmly attached to one point on said beam and holding said header laterally and downward to said one point on said beam, a second holding means holding said header to said traveling frame while permitting movement of said header transverse to the length of said traveling frame, and a third holding means holding said header to said frame and permitting movement parallel to the length of said traveling frame, said holding means being spaced away from each other on said frame; said ledge of said ledge frame extending vertically over said longitudinal beam and horizontally over said second holding means on said traveling frame.